US011678378B2

(12) United States Patent
Lin et al.

(10) Patent No.: US 11,678,378 B2
(45) Date of Patent: Jun. 13, 2023

(54) BASE STATION AND USER EQUIPMENT FOR EARLY-DATA TRANSMISSION IN A RANDOM ACCESS PROCEDURE

(71) Applicant: Institute For Information Industry, Taipei (TW)

(72) Inventors: Yi-Ting Lin, New Taipei (TW); Hai-Han Wang, Taipei (TW)

(73) Assignee: Institute For Information Industry, Taipei (TW)

( * ) Notice: Subject to any disclaimer, the term of this patent is extended or adjusted under 35 U.S.C. 154(b) by 87 days.

(21) Appl. No.: 17/215,244

(22) Filed: Mar. 29, 2021

(65) Prior Publication Data

US 2021/0219351 A1    Jul. 15, 2021

Related U.S. Application Data

(62) Division of application No. 16/534,976, filed on Aug. 7, 2019, now abandoned.
(Continued)

(51) Int. Cl.
*H04W 74/08*    (2009.01)
*H04W 68/02*    (2009.01)
(Continued)

(52) U.S. Cl.
CPC ....... *H04W 74/0833* (2013.01); *H04L 1/1812* (2013.01); *H04W 68/02* (2013.01);
(Continued)

(58) Field of Classification Search
CPC ............................ H04L 1/1812; H04W 68/02; H04W 72/1278; H04W 72/14; H04W 74/006;
(Continued)

(56) References Cited

U.S. PATENT DOCUMENTS

2018/0070382 A1 * 3/2018 Lee .................. H04W 52/02
2018/0324869 A1 * 11/2018 Phuyal ............. H04W 72/14
(Continued)

FOREIGN PATENT DOCUMENTS

WO    WO-2019134593 A1 *  7/2019
WO    WO-2019159294 A1 *  8/2019
WO    WO-2019184807 A1 * 10/2019 ............ H04W 28/16

OTHER PUBLICATIONS

Qualcomm Incorporated, "Early data transmission and SPS", 3GPP TSG RAN WG1 Meeting #90 R1-1712808, Prague, Czechia, Aug. 21-25, 2017, Total pp. 18 (Year: 2017).*
(Continued)

*Primary Examiner* — Shah M Rahman
(74) *Attorney, Agent, or Firm* — Skaar Ulbrich Macari, P.A.

(57) ABSTRACT

A base station transmits a paging message carrying a contention-free early-data transmission indication to a user equipment, and transmits a random access response message carrying early downlink data to the user equipment in response to a random access request message transmitted by the user equipment in a random access procedure. A base station transmits a paging message carrying a contention-based early-data transmission indication to the user equipment, and transmits an RRC response message carrying early downlink data to the user equipment in response to an RRC request message transmitted by the user equipment in a random access procedure. In a random access procedure, user equipment generates and transmits a scheduling request message to a base station after receiving early downlink data transmitted by the base station, and transmits uplink data corresponding to the early downlink data to the base station according to an uplink grant transmitted by the base station.

10 Claims, 6 Drawing Sheets

Related U.S. Application Data (60) Provisional application No. 62/715,292, filed on Aug. 7, 2018.

(51) Int. Cl.
*H04L 1/1812* (2023.01)
*H04W 76/27* (2018.01)
*H04W 72/20* (2023.01)
*H04W 72/23* (2023.01)

(52) U.S. Cl.
CPC ........... *H04W 72/20* (2023.01); *H04W 72/23* (2023.01); *H04W 76/27* (2018.02)

(58) Field of Classification Search
CPC ............. H04W 74/0833; H04W 76/27; H04W 74/004; H04W 72/20; H04W 72/23
See application file for complete search history.

(56) References Cited

U.S. PATENT DOCUMENTS

| | | | |
|---|---|---|---|
| 2019/0037447 A1* | 1/2019 | Lee | H04W 76/27 |
| 2019/0045554 A1* | 2/2019 | Ye | H04W 74/0833 |
| 2019/0223221 A1* | 7/2019 | Johansson | H04W 68/02 |
| 2019/0342800 A1* | 11/2019 | Sirotkin | H04B 17/318 |
| 2020/0015112 A1* | 1/2020 | Kim | H04W 48/02 |
| 2020/0037345 A1* | 1/2020 | Ryoo | H04W 72/1284 |
| 2020/0187084 A1* | 6/2020 | Fujishiro | H04W 36/385 |
| 2020/0187245 A1* | 6/2020 | Fujishiro | H04W 72/0413 |
| 2020/0245363 A1* | 7/2020 | Kim | H04W 74/0833 |
| 2020/0245370 A1* | 7/2020 | Höglund | H04W 74/0833 |
| 2020/0314910 A1* | 10/2020 | Höglund | H04W 48/10 |
| 2020/0344818 A1* | 10/2020 | Höglund | H04W 74/004 |
| 2020/0374927 A1* | 11/2020 | Yu | H04W 74/006 |
| 2020/0374934 A1* | 11/2020 | Koskinen | H04W 76/27 |
| 2020/0374966 A1* | 11/2020 | Chang | H04W 74/0833 |
| 2021/0037433 A1* | 2/2021 | Lee | H04W 48/06 |
| 2021/0045084 A1* | 2/2021 | Liu | H04W 4/02 |
| 2021/0045162 A1* | 2/2021 | Höglund | H04W 48/10 |
| 2021/0058973 A1* | 2/2021 | Fujishiro | H04W 72/04 |
| 2021/0112590 A1* | 4/2021 | Kim | H04W 76/27 |
| 2021/0127449 A1* | 4/2021 | da Silva | H04W 76/11 |
| 2022/0256587 A1* | 8/2022 | Fujishiro | H04W 4/70 |

OTHER PUBLICATIONS

LG Electronics, "EDT MT scenarios", 3GPP TSG-RAN WG2 Meeting #101 R2-1805915, Sanya, China, Apr. 16-20, 2018, Total pp. 3 (Year: 2018).*

LG Electronics, "Data transmission during random access procedure in NB-IoT", 3GPP TSG RAN WG1 Meeting #92bis R1-1804522, Sanya, China, Apr. 16-20, 2018, Total pp. 8 (Year: 2018).*

Huawei, "Report of the Email discussion [101#57][NB-IoT/MTC R15] EDT remaining issues", 3GPP TSG-RAN WG2 Meeting #101bis R2-1805078, Sanya, China, Apr. 16-20, 2018, Total pp. 23 (Year: 2018).*

NTT Docomo, "Chairman's notes of AI 6.2.6 even further enhanced MTC for LTE", 3GPP TSG RAN WG1 Meeting #92bis R1-1805427, Sanya, China, Apr. 16-20, 2018, Total pp. 6 (Year: 2018).*

Ericsson, "Remaining Issues in Early Data Transmission over NAS", 3GPP TSG-RAN WG2 #100 R2-1713056, Reno, Nevada, USA, Nov. 27-Dec. 1, 2017, Total pp. 7 (Year: 2017).*

Huawei, "Early DL data transmission", 3GPP TSG RAN WG2 Meeting #101 R2-1802222, Athens, Greece, Feb. 26-Mar. 2, 2018, Total pp. 5 (Year: 2018).*

* cited by examiner

BASE STATION AND USER EQUIPMENT FOR EARLY-DATA TRANSMISSION IN A RANDOM ACCESS PROCEDURE

PRIORITY

This application is a divisional of U.S. patent application Ser. No. 16/534,976, filed Aug. 7, 2019, which claims priority to U.S. Provisional Patent Application Ser. No. 62/715,292 filed on Aug. 7, 2018, and both of which are hereby incorporated by reference in their entirety.

FIELD

Embodiments of the present invention relate to a base station and a user equipment. More particularly, the embodiments of the present invention relate to base station and a user equipment performing early-data transmission during a random access procedure.

BACKGROUND

In conventional cellular communication systems, a user equipment may establish a connection with a base station via a random access procedure, and the user equipment and the base station may perform uplink data transmission and downlink data transmission after establishing the connection between them.

For example, under the structure of the Narrow Band Internet of Things (NB-IoT), the user equipment may establish a connection with the base station based on a random access procedure defined by the Long Term Evolution (LTE). The random access procedure sequentially includes the following five steps: transmitting a random access request message (referred to as Message 1) from a user equipment to a base station; transmitting a random access response message (referred to as Message 2) from the base station to the user equipment; transmitting an RRC connection request message (referred to as Message 3) from the user equipment to the base station; transmitting an RRC connection setup message (referred to as Message 4) from the base station to the user equipment to enable the user equipment to enter an RRC connected state; and transmitting an RRC connection complete message (referred to as Message 5) from the user equipment to the base station.

According to the random access procedure defined by the LTE, the user equipment and the base station can perform transmissions of uplink data and downlink data only after the user equipment enters the RRC connected state. The user equipment in the RRC connected state also represents that data can be exchanged between the user equipment and the base station. In other words, the user equipment in an idle state has to complete the above random access procedure with the base station so as to perform data transmission with the base station. In addition, the random access procedure under the NB-IoT uses repetition technology to increase transmission coverage, which will consume more power and time and thus lower data transmission efficiency and resource utilization rate. In view of this, it is important in the art to improve such random access procedure so as to increase data transmission efficiency and resource utilization rate.

SUMMARY

To solve at least the aforesaid problem, certain embodiments herein provide a base station for performing a random access procedure with a user equipment. The base station may comprise a processor and a transceiver electrically connected to each other. The processor may be configured to generate a contention-free early-data transmission (EDT) indication which comprises a contention-free resource. The transceiver may be configured to transmit a paging message including the contention-free early-data transmission indication to the user equipment. The transceiver may be configured to receive a random access request message which the user equipment transmits on the contention-free resource, after transmitting the paging message. The transceiver may further be configured to transmit a random access response message carrying early downlink data to the user equipment in response to the random access request message.

To solve at least the aforesaid problem, certain embodiments herein provide a base station for performing a random access procedure with a user equipment. The base station may comprise a processor and a transceiver electrically connected to each other. The processor may be configured to generate a contention-based early-data transmission indication. The transceiver may be configured to transmit a paging message including the contention-based early-data transmission indication to the user equipment. The transceiver may be configured to receive a random access request message which the user equipment transmits on a contention-based resource related to the random access procedure, after transmitting the paging message. The transceiver may be configured to transmit a random access response message to the user equipment in response to the random access request message. The transceiver may be configured to receive a radio resource control (RRC) request message from the user equipment after transmitting the random access response message. The transceiver may be further configured to transmit an RRC response message carrying early downlink data in response to the RRC request message.

To solve at least the aforesaid problem, certain embodiments herein provide a user equipment for performing a random access procedure with a base station. The user equipment may comprise a processor and a transceiver electrically connected to each other. The processor may be configured to generate a scheduling request message in response to early downlink data transmitted by the base station in the random access procedure. The transceiver may be configured to receive the early downlink data in the random access procedure. The transceiver may be configured to transmit the scheduling request message to the base station after receiving the early downlink data. The transceiver may be configured to receive an uplink grant from the base station after transmitting the scheduling request message to the base station. The transceiver may further be configured to transmit uplink data corresponding to the early downlink data to the base station according to the uplink grant.

The base station may additionally concatenate early downlink data in a random access response message or an RRC response message transmitted to the user equipment during performing random access procedure with the user equipment, and thereby transmits downlink data to the user equipment in advance. That is to say, the downlink data which can only be transmitted by the conventional base station after the completion of the random access procedure (that is, after the Message 5 takes effect) will be able to be transmitted during the random access procedure in advance (that is, be transmitted via the Message 2 or the Message 4 in advance). In doing so, the time delay for transmitting the downlink data can be saved, that is, the transmission efficiency of the downlink data can be increased. In addition, since the downlink data from the base station can be transmitted via the Message 2 or the Message 4 in advance, the Message 3, the Message 4, and/or the Message 5 (i.e., the subsequent messages) can be cancelled and the resources required for those messages can be released to other applications, and thereby increasing the utilization of resources. Under the circumstances, since the number of signaling between the base station and the user equipment is reduced, the power consumption of the user equipment can be especially effectively reduced, especially for the NB-IoT system which needs a large number of repetitions.

On the other hand, after receiving the early downlink data transmitted by the base station, the user equipment may generate and transmit a scheduling request message to the base station, and transmit uplink data corresponding to the early downlink data to the base station according to an uplink grant from the base station. In this case, it is not limited that the user equipment must transmit the corresponding uplink data after the completion of the random access procedure, and this will improve the efficiency of uplink data transmission as well.

What described above is not intended to limit the present invention, but only generally describes the technical problem that can be solved by the present invention, the technical means that can be adopted and the technical effect that can be achieved so that a person having ordinary skill in the art can preliminarily understand the present invention. Details of the embodiments of the present invention can be further understood by a person having ordinary skill in the art according to attached drawings and contents recorded in the following description of the preferred embodiments.

DETAILED DESCRIPTION

The present invention will be described hereinafter with reference to certain example embodiments thereof. However, these example embodiments are not intended to limit that the present invention can only be implemented according to the operations, environment, applications, structures, examples, embodiments, processes or steps described in these example embodiments. In the attached drawings, elements unrelated to the present invention are omitted from depiction, but may be implied by the attached drawings, and dimensions of elements and proportional relationships among individual elements in the attached drawings are only exemplary examples but not intended to limit the present invention. Unless stated particularly, same (or similar) element symbols may correspond to same (or similar) elements in the following description. Unless stated specifically, the number of each element described hereinafter may be one or more while it can be implemented.

The terms in the present disclosure are only used to describe the embodiments instead of limiting the present invention. Unless otherwise stated, the singular forms such as "a/an" also intend to cover plural forms. The terms "comprise," "include," or the like indicate the existence of the features, numbers, steps, operations, elements, and/or components, instead of limiting one or more of the features, numbers, steps, operations, elements, components, and/or the combinations thereof. The term "and/or" comprises any and all of the combinations of one or more listed items.

Figure 1:
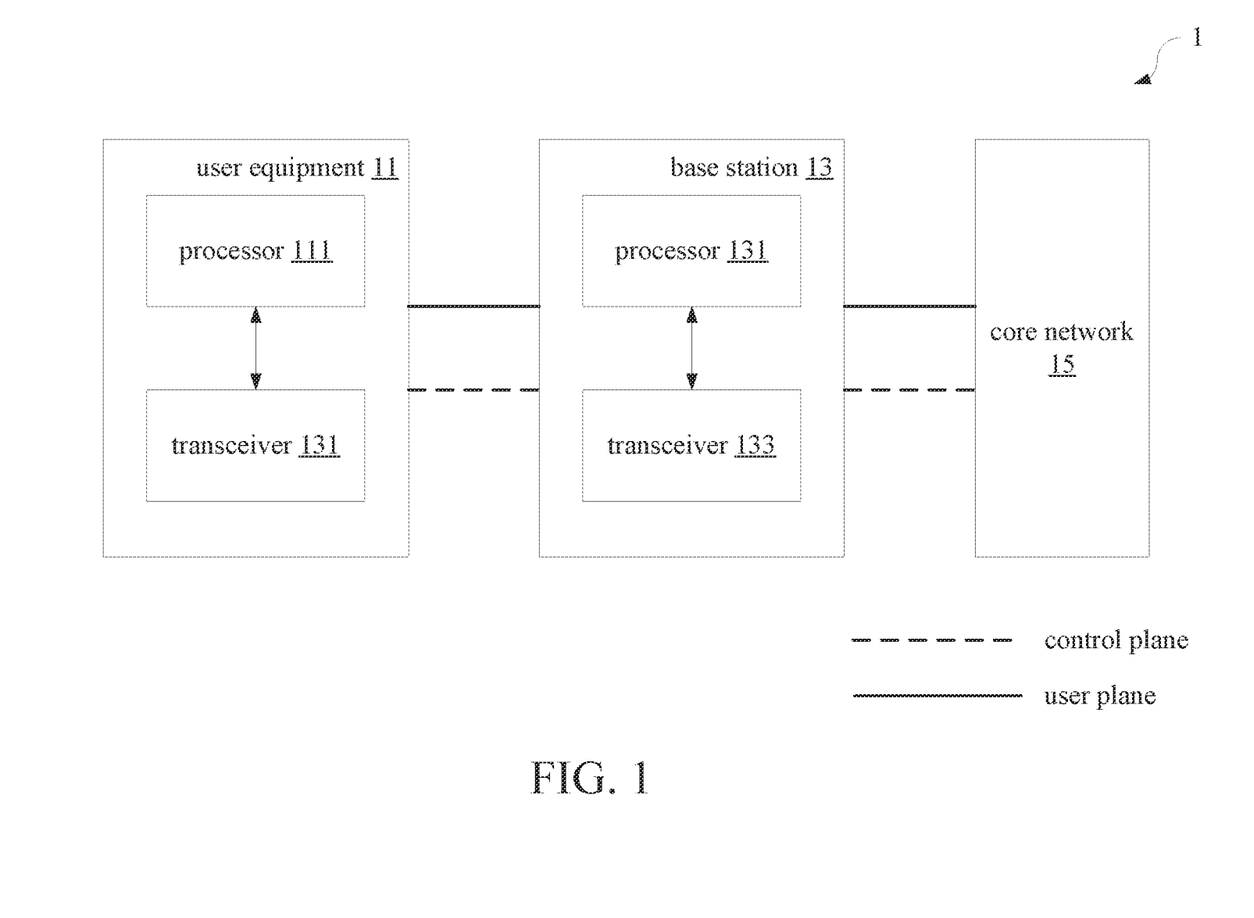
FIG. 1 illustrates a schematic view of a wireless communication system according to some embodiments.

FIG. 1 illustrates a schematic view of a wireless communication system according to some embodiments. Contents shown in FIG. 1 are only for illustrating embodiments of the present invention rather than for limiting the present invention.

Referring to FIG. 1, a wireless communication system 1 may basically comprise a user equipment 11, a base station 13, and a core network 15. The wireless communication system 1 may be one of various communication systems, which include for example but not limited to a Narrow Band-IoT (NB-IoT) system, an enhanced Machine-Type Communication (eMTC) system, a massive Machine-Type Communications (mMTC) system, or the like. Depending on different applications, the user equipment 11 and the base station 13 can be implemented with different types. For example, the user equipment 11 may be a mobile phone, a tablet computer, a notebook computer, or the like, and the base station 13 may be a macrocell base station, a microcell base station, a picocell base station, or the like. The architecture of the base station 13 may include a Centralized Unit (CU) and/or one or more Distributed Units (DUs).

The user equipment 11 may basically comprise a processor 111 and a transceiver 113. In the user equipment 11, the processor 111 is electrically connected (in a direct way or indirect way) to the transceiver 113. The base station 13 may basically comprise a processor 131 and a transceiver 133. In the base station 13, the processor 131 is electrically connected (in a direct way or indirect way) to the transceiver 133.

Each of the processor 111 and the processor 131 may be one of various microprocessors or microcontrollers capable of signal processing. The microprocessor or microcontroller is a special integrated circuit that can be programmed and is capable of operating, storing, outputting/inputting or the like, and can receive and process various coded instructions, thereby performing various logical operations and arithmetical operations and outputting corresponding operational results. The processor 111 may be programmed to interpret various instructions so as to process data and execute various operations or programs in the user equipment 11. The processor 131 may be programmed to interpret various instructions so as to process data and execute various operations or programs in the base station 13.

Each of the transceiver 113 and the transceiver 133 may be formed of a transmitter and a receiver, and may comprise for example but not limited to various communication elements such as an antenna, an amplifier, a modulator, a demodulator, a detector, an analog-to-digital converter, a digital-to-analog converter or the like. The transceiver 113 may enable the user equipment 11 to communicate and exchange data with an external device (e.g., the base station 13). The transceiver 133 may enable the base station 13 to communicate and exchange data with an external device (e.g., the user equipment 11 and the core network 15). The base station 13 may communicate with the core network 15 in a wired or wireless manner.

Taking the LTE as an example, the user equipment 11 and the base station 13 may use a control plane or a user plane to transmit messages and/or data. The user equipment 11 and the base station 13 may also use the control plane or the user plane to transmit messages and/or data with the core network 15. Transmission paths established by the control plane may comprise a path between the user equipment 11 and the base station 13 and a path between the base station 13 and a mobility management entity (MME) of the core network 15. Transmission paths established by the user plane may comprise a path between the user equipment 11 and the base station 13, a path between the base station 13 and the serving gateway (S-GW) of the core network 15, and a path between the S-GW of the core network 15 and a packet data network gateway (P-GW) of the core network 15. The messages and/or data transmitted on the control plane are processed/controlled by the MME in the core network 15, and the messages and/or data transmitted on the user plane are processed/controlled by the S-GW in the core network 15.

A random access procedure without early-data transmission may be referred to as a legacy random access procedure, and messages transmitted therein may be referred to as legacy messages. Depending on the entity that initiate the early-data transmission, an early-data transmission can be classified into a Mobile-Originated EDT (MO-EDT) or a Mobile-Terminated EDT (MT-EDT). In details, an MO-EDT refers to that a user equipment determines and initiates early-data transmission being a user equipment, while an MT-EDT refers to that a base station and an MME of a core network together determine and initiate early-data transmission. The messages transmitted in the random access procedure with MO-EDT (called the MO-EDT random access procedure) may be referred to as MO-EDT messages, and the messages transmitted in the random access procedure with MT-EDT (called the MT-EDT random access procedure) may be referred to as MT-EDT messages. Unless otherwise stated, the random access procedure in the embodiments of the present invention is directed to the MT-EDT random access procedure.

Figure 2:
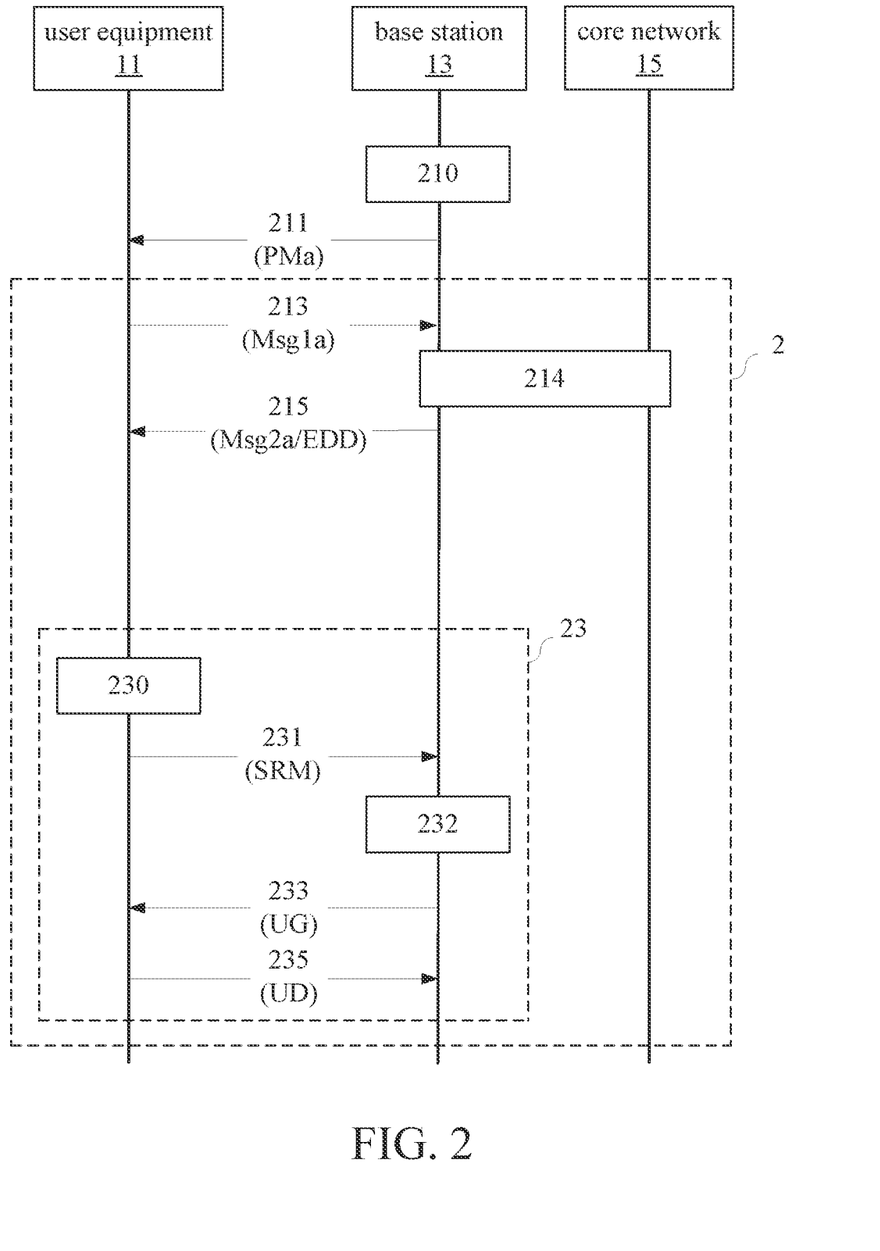
FIG. 2 illustrates a schematic view of early-data transmission during a contention-free random access procedure performed in the wireless communication system of FIG. 1 according to some embodiments.
Figure 3:
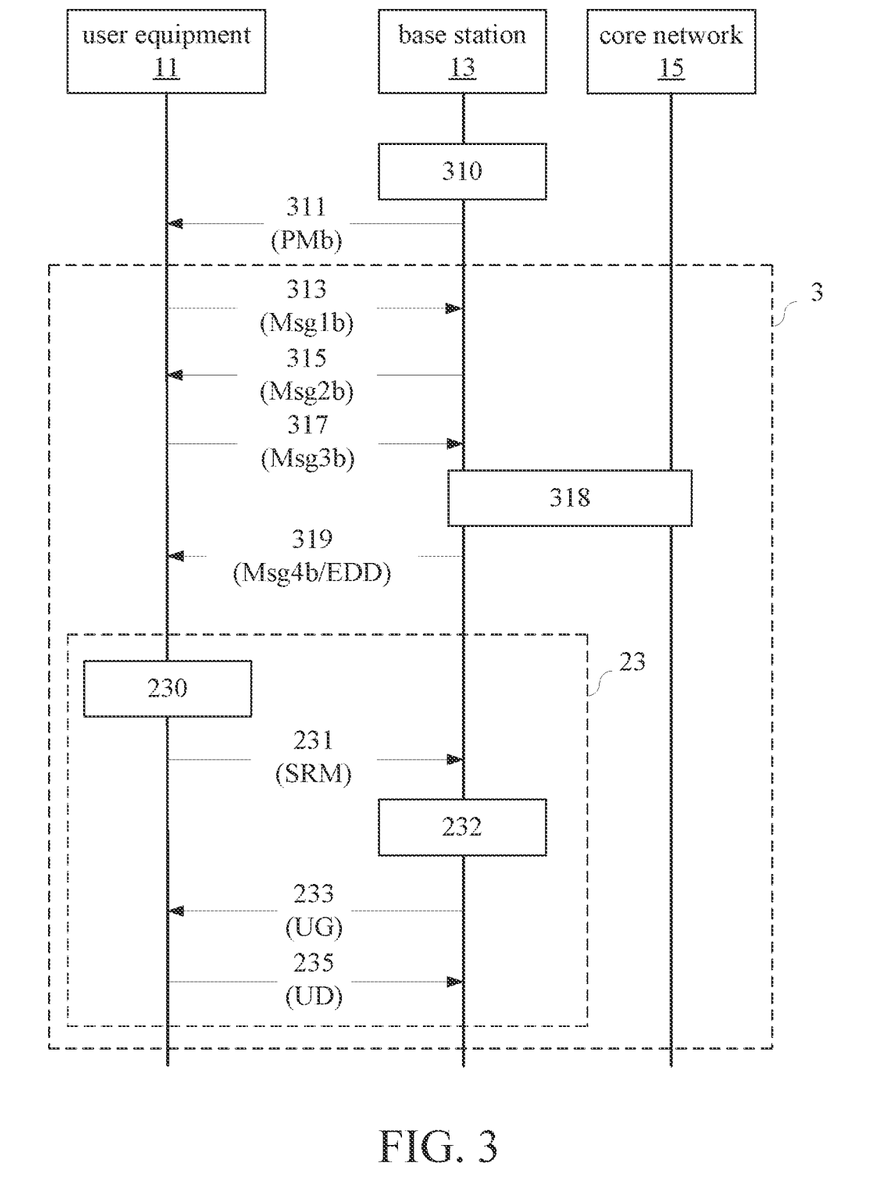
FIG. 3 illustrates a schematic view of early-data transmission during a contention-based random access procedure performed in the wireless communication system of FIG. 1 according to some embodiments.

In some embodiments, the user equipment 11 and the base station 13 may perform a contention-free random access procedure, and in some other embodiments, the user equipment 11 and the base station 13 may perform a contention-based random access procedure. FIG. 2 and FIG. 3 respectively illustrate an early-data transmission in a contention-free random access procedure and an early-data transmission in a contention-based random access procedure performed by the wireless communication system 1 according to some embodiments. Contents shown in FIG. 2 and FIG. 3 are only for illustrating embodiments of the present invention rather than for limiting the present invention.

Referring to FIG. 2 first, in order to inform the user equipment 11 that the base station 13 is going to perform early-data transmission, the processor 131 of the base station 13 may generate a contention-free early-data transmission indication (labeled as an action 210) at the beginning, and the contention-free early-data transmission indication comprises a contention-free resource configured by the base station 13 for the user equipment 11.

Next, as shown in FIG. 2, the transceiver 133 of the base station 13 may transmit a paging message PMa to the user equipment 11 (labeled as an action 211), and the paging message PMa comprises the contention-free early-data transmission indication. In some embodiments, an identity (ID) of the user equipment 11 in the paging message PMa is used for indicating that the user equipment 11 is the user equipment to receive the paging message PMa.

The base station 13 may inform the user equipment 11 that the base station 13 is going to initiate early-data transmission in a subsequent contention-free random access procedure 2, by the contention-free early-data transmission indication attached to the paging message PMa. In some embodiments, the base station 13 may depend on the contention-free resource configured by itself to inform the user equipment 11 whether the base station 13 is going to initiate early-data transmission in the contention-free random access procedure 2. In other words, the user equipment 11 may determine whether the base station 13 is going to initiate early-data transmission in the contention-free random access procedure 2 according to whether the received the paging message PMa includes the contention-free resource. In some embodiments, the base station 13 may also depend on a bit for informing early-data transmission configured in the paging message PMa to inform the user equipment 11 whether the base station 13 is going to initiate early-data transmission in the contention-free random access procedure 2. For example, if the bit for early-data transmission configured in the paging message PMa is "1", it represents that the base station 13 is going to initiate early-data transmission in the contention-free random access procedure 2, and if the bit for early-data transmission is "0", it represents that the base station 13 will not perform early-data transmission in the contention-free random access procedure 2.

According to the contention-free resource configured by the base station 13, the user equipment 11 may perform a contention-free random access procedure 2 with the base station 13. In some embodiments, a contention-free resource may comprise a dedicated preamble and a dedicated random access channel (e.g., a dedicated NB-IoT physical random access channel, NPRACH). The user equipment 11 may transmit the dedicated preamble at a dedicated location of the dedicated random access channel according to current standard specifications. If the user equipment 11 uses the dedicated random access channel to transmit the dedicated preamble to the base station 13, the base station 13 may identify the user equipment 11 and perform the contention-free random access procedures 2 with the user equipment 11 when receiving the dedicated preamble. In some embodiments, the contention-free resource may comprise a preamble index instead of the dedicated preamble. The preamble index is used to indicate a dedicated resource location (e.g., a dedicated time point), and thus the user equipment 11 may obtain (monitor or detect) the dedicated preamble at the dedicated resource location according to the preamble index.

After the base station 13 transmits the paging message PMa to the user equipment 11, the user equipment 11 may use the contention-free resource to transmit a random access request message Msg1a to the base station 13 (labeled as an action 213). For example, if the contention-free resource comprises the dedicated preamble and the dedicated NPRACH, the user equipment 11 may transmit the dedicated preamble (i.e., the random access request message Msg1a) to the base station 13 via the dedicated NPRACH.

When the base station 13 receives the random access request message Msg1a (i.e., the dedicated preamble) which the user equipment 11 transmits on the contention-free resource (e.g., the dedicated NPRACH), the processor 131 of the base station 13 decodes the random access request message Msg1a and confirms that the user equipment 11 is ready to receive early downlink data EDD from the base station 13. Then, the transceiver 133 of the base station 13 transmits a random access response message Msg2a carrying the early downlink data EDD to the user equipment 11 (labeled as an action 215).

In the case where the base station 13 transmits the early downlink data EDD to the user equipment 11 on the control plane, the early downlink data EDD carried by the random access response message Msg2a may be packaged into a Downlink Non-Access Stratum Protocol Data Unit (Downlink NAS PDU) and be protected by Non-Access Stratum security (NAS security). After the user equipment 11 attached to network successfully, the NAS security of the user equipment 11 will keep in synchronization with the NAS security of the MME of the core network 15, and therefore any uplink data or downlink data may be successfully encrypted or decrypted based on the NAS security.

In the case where the base station 13 transmits the early downlink data EDD to the user equipment 11 on the user plane, the early downlink data EDD may be directly carried in the random access response message Msg2a by the base station 13 and be protected by Access Stratum security (AS security). The base station 13 may provide an updated key to the user equipment 11 in each random access procedure so that the user equipment 11 can encrypt and decrypt data during the next random access procedure. For example, the base station 13 may provide a Next-hop Chaining Count (NCC) via an RRC connection release message in each random access procedure, for the use of the user equipment 11 in the next random access procedure.

After the base station 13 transmits the random access response message Msg2a carrying the early downlink data EDD to the user equipment 11, the base station 13 may perform the following actions (not shown) with the user equipment 11. For example, similar to a legacy random access procedure, the user equipment 11 may transmit a legacy Message 3 to the base station 13 after receiving the random access response message Msg2a to request RRC resources. The base station 13 may then transmit a legacy Message 4 to the user equipment 11 to provide a RRC resource configuration. At last, after entering the RRC connected state, the user equipment 11 transmits a legacy Message 5 to the base station 13. For another example, the user equipment 11 may transmit a confirmation message for the early downlink data EDD after receiving the random access response message Msg2a, and then remain in the RRC idle state. In addition, in some embodiments where the base station 13 transmits early downlink data to the user equipment 11 on the user plane, the user equipment 11 may resume the radio bearer (not shown) before transmitting the Message 1 or the Message 3. After the user equipment 11 resumes the radio bearer, it is ready to decode the downlink data. That is, before receiving the downlink data transmitted by the base station 13 (via the Message 2 or the Message 4), the user equipment 11 has resumed the operations of the Medium Access Control (MAC) layer. For example, these operations includes configuring the memory used for resuming the MAC entity in advance, and reading the parameters related to the MAC layer are read in advance.

After the user equipment 11 transmits the random access request message Msg1a to the base station 13 (i.e., the action 213), the base station 13 and the core network 15 may perform the signaling transmissions (labeled as an action 214) in advance which should be performed for the base station 13 to receive the early downlink data EDD from the core network 15 to the base station 13 after the user equipment 11 enters the RRC connected state. For example, in the case where the user equipment 11 and the base station 13 perform the contention-free random access procedure 2 on the control plane, the action 214 may comprise: the base station 13 retrieving a user equipment context from the MME of the core network 15; the base station 13 transmitting an S1-Application Protocol initial user equipment message (S1-AP initial UE message) carrying an early-data transmission indicator to the MME to inform the MME that the base station 13 is going to initiate an MT-EDT; the MME transmitting a Modify Bearer Request Message to the S-GW of the core network 15 and receiving a Modify Bearer Response Message transmitted by the S-GW to establish a channel for transmitting data between the S-GW and the MIME; and after establishing the channel for transmitting data between the S-GW and the MME, the MME receiving the early downlink data EDD transmitted by the S-GW and then transmitting a Downlink S1-AP Message to the base station 13 to transmit the early downlink data EDD to the base station 13.

On the other hand, in the case where the user equipment 11 and the base station 13 perform the contention-free random access procedure 2 on the user plane, the action 214 may comprise: the base station 13 transmitting an S1-Application Protocol User Equipment Context Resume Request Message (S1-AP UE Context Resume Request Message) to the MME of the core network 15 and receiving an S1-Application Protocol User Equipment Context Resume Response Message (S1-AP UE Context Resume Response Message) returned by the MME; the base station 13 concatenating an early-data transmission indicator to the S1-AP UE Context Resume Request Message to inform the MME that the base station 13 is going to initiate an MT-EDT; the MME transmitting a Modify Bearer Request Message to the S-GW of the core network 15 and receiving a Modify Bearer Response Message transmitted by the S-GW to establish a channel for transmitting data between the S-GW and the base station 13; and after establishing the channel for transmitting data between the S-GW and the base station 13, the base station 13 receiving the early downlink data EDD transmitted by the S-GW.

Continuously referring to FIG. 2, in the contention-free random access procedure 2, optionally, after the action 215 is performed by the base station 13 and the user equipment 11, the user equipment 11 may generate a corresponding uplink data UD in response to the early downlink data EDD transmitted by the base station 13 in the action 215, and may perform an operation 23 with the base station 13 to transmit the uplink data UD corresponding to the early downlink data EDD to the base station 13. The operation 23 may be initiated and completed in the contention-free random access procedure 2, or may be initiated after the end of the contention-free random access procedure 2. The operation 23 may be performed when the user equipment 11 is in an RRC connected state or an RRC idle state. If the uplink data UD is transmitted to the base station 13 in the contention-free random access procedure 2, the uplink data UD may be referred to as an early uplink data.

In detail, in operation 23, the processor 111 of the user equipment 11 may generate a scheduling request message SRM (labeled as an action 230), and then, the transceiver 113 of the user equipment 11 may transmit the scheduling request message SRM to the base station 13 (labeled as an action 231). In some embodiments, the scheduling request message SRM may carry a Hybrid Automatic Repeat Request acknowledgement (HARQ ACK) for the early downlink data EDD to inform the base station 13 that the user equipment 11 acknowledges receipt of the early downlink data EDD transmitted by the base station 13.

After the base station 13 receives the scheduling request message SRM, the processor 131 of the base station 13 may generate downlink control information (DCI) with an uplink grant UG for the scheduling request message SRM (labeled as an action 232). Next, the transceiver 133 may transmit the downlink control information to the user equipment 11 (labeled as an action 233).

After the user equipment 11 receives the downlink control information with the uplink grant UG, the transceiver 113 may transmit uplink data UD corresponding to the early downlink data EDD to the base station 13 using the uplink grant UG (labeled as an action 235). In some embodiments, the user equipment 11 may transmit the uplink data UD to the base station 13 by concatenating the uplink data UD in a legacy Message 3 (e.g. an RRC early-data request message or an RRC connection resume request message) or a legacy Message 5 (e.g. an RRC connection complete message) which is going to be transmitted to the base station 13. In some embodiments, the user equipment 11 may also transmit the uplink data UD to the base station 13 by concatenating the uplink data UD in other RRC messages via a dedicated traffic channel. In some cases where the user equipment 11 transmits the uplink data UD by concatenating the uplink data UD to these messages (i.e., the legacy Message 3, the legacy Message 5, or other RRC messages), the user equipment 11 may additionally concatenate data volume information or Buffer Status Report information in these messages to inform the base station 13 of a data transmission status of the user equipment 11. The data transmission status may indicate, for example, whether the user equipment 11 has had no data to transmit. In some cases where the user equipment 11 transmits the uplink data UD by concatenating the uplink data UD to other RRC messages, the user equipment 11 and the base station 13 may be prevented from entering the RRC connected state, thereby saving time or resource required for the transmission of the subsequent messages in the random access procedure. If the user equipment 11 intends to transmit the uplink data UD on the control plane, the uplink data UD carried by these RRC messages (i.e., the legacy Message 3, the legacy Message 5, or other RRC messages) may be packaged into an Uplink NAS PDU. If the user equipment 11 is intended to transmit the uplink data UD on the user plane, the user equipment 11 may directly concatenate the uplink data UD in these RRC messages (i.e., the legacy Message 3, the legacy Message 5, or other RRC messages).

Referring to FIG. 3, by way of another example, the processor 131 of the base station 13 may generate a contention-based early-data transmission indication (labeled as action 310) at the beginning. Next, the transceiver 133 of the base station 13 may transmit a paging message PMb to the user equipment 11 (labeled as an action 311), and an identity (ID) of the user equipment 11 in the paging message PMb is used for indicating that the user equipment 11 is the user equipment to receive the paging message PMb. The paging message PMb may comprise a contention-based early-data transmission indication, which may comprise a bit for informing early-data transmission, used for informing the user equipment 11 that the base station 13 is going to initiate early-data transmission in the contention-based random access procedure 3. For example, when the user equipment 11 decodes the received paging message PMb and identifies that the paging message PMb contains a bit for informing early-data transmission of "1," it will get that the base station 13 is going to initiate early-data transmission in the contention-based random access procedure 3. For another example, the base station 13 may preset a bit of the paging message PMb for informing early-data transmission. In this case, the base station 13 is going to initiate early-data transmission in the contention-based random access procedure 3 when the bit for informing early-data transmission transmitted is "1," while the base station 13 will not initiate the early-data transmission in the contention-based random access procedure 3 when the bit for informing early-data transmission transmitted is "0."

After the base station 13 transmits the paging message PMb, the transceiver 131 may receive a random access request message Msg1*b* transmitted by the user equipment 11 (labeled as action 313). The user equipment 11 transmits the random access request message Msg1*b* on a contention-based resource related to the contention-based random access procedure 3. In some embodiments, the user equipment 11 may transmit a preamble (i.e., the random access request message Msg1*b*) on a legacy NPRACH resource, which is a contention-based resource for other legacy user equipment, to establish a connection with the base station 13. In some embodiments, the user equipment 11 may transmit a preamble (i.e., the random access request message Msg1*b*) on a MO-EDT NPRACH resource, which is a contention-based resource for other EDT capable user equipment, to establish a connection with the base station 13.

In response to the random access request message Msg1*b*, the transceiver 133 of the base station 13 may transmit a random access response message Msg2*b* to the user equipment 11 (labeled as an action 315). After transmitting the random access response message Msg2*b*, the transceiver 133 of the base station 13 may receive an RRC request message Msg3*b* from the user equipment 11 (labeled as an action 317). In response to the RRC request message Msg3*b*, the transceiver 133 of the base station 13 may transmit an RRC response message Msg4*b* carrying the early downlink data EDD to the user equipment 11 (labeled as an action 319).

The RRC request message Msg3*b* transmitted by the user equipment 11 on the control plane may be referred to as an RRC connection request message for requesting an RRC connection. In some embodiments, the RRC response message Msg4*b* transmitted by the base station 13 on the control plane may be a designed RRC early-data complete message. The RRC early-data complete message may be used to indicate the user equipment 11 to remain in the RRC idle state after receiving the early downlink data EDD. That is, the RRC early-data complete message indicates the user equipment 11 to discontinue the actions of entering the RRC connected state. In some embodiments, the RRC response message Msg4*b* transmitted by the base station 13 on the control plane may also be a legacy RRC connection setup message. The RRC connection setup message is used to indicate the user equipment 11 to enter the RRC connected state according to the RRC resource after receiving the early downlink data EDD.

The RRC request message Msg3*b* transmitted by the user equipment 11 on the user plane may be referred to as an RRC connection resume request message for requesting to resume the RRC connection. In some embodiments, the RRC response message Msg4*b* transmitted by the base station 13 on the user plane may be referred to as an RRC connection resume message. The RRC connection resume message may be used to indicate the user equipment 11 to resume to the RRC connected state after receiving the early downlink data EDD. In some embodiments, the RRC response message Msg4b transmitted by the base station 13 on the user plane may also be referred to as an RRC connection release message. The RRC connection release message may be used to indicate the user equipment 11 not to enter the RRC connected state after receiving the early downlink data EDD.

In the case where the user equipment 11 transmits the preamble (i.e., the random access request message Msg1b) on a legacy NPRACH resource, the random access response message Msg2b transmitted by the base station 13 will configure a legacy transport block size limitation (for example, "88 bits") for the user equipment 11. According to the legacy transport block size limitation, the RRC request message Msg3b transmitted by the user equipment 11 will be a legacy Message 3 which does not additionally carry uplink data.

In some embodiments, the MT-EDT of the embodiments of the present invention may also be directly applied to an MO-EDT random access procedure. That is, the base station 13 and the MME of the core network 15 may also actively initiate early-data transmission in an MO-EDT random access procedure. In details, in the case where the user equipment 11 transmits the preamble (i.e., the random access request message Msg1b) to the base station 13 on a EDT NPRACH resource, the random access response message Msg2b transmitted by the base station 13 may be configured with a larger transport block size limitation (For example, "720 bits") for the user equipment 11, so that the user equipment 11 is able to determine whether to additionally concatenate uplink data UD in the RRC request message Msg3b. The RRC request message Msg3b at this time may be referred to as an RRC connection request message of the MO-EDT or an RRC early-data request message. In some embodiments, if the user equipment 11 decides not to additionally concatenate the uplink data UD in the RRC request message Msg3b, the processor 111 of the user equipment 11 may adjust the number of repetition of the RRC request message Msg3b according to the transport block size limitation configured by the random access response message Msg2b, and thus reduce the power consumption of the user equipment 11. For example, if a legacy transport block size limitation is "88 bits" (for the case of not carrying uplink data UD), the actual transport block size limitation configured by the random access response message Msg2b is "440 bits", and a preset number of repetition is "10", and then the user equipment 11 may obtain a result that the number of repetition of the RRC request message Msg3b should be changed to "2" by multiplying the preset number of repetition with the ratio of the legacy transport block size limitation to the actual transport block size limitation (i.e., 10×88/440).

In the case where the base station 13 transmits the early downlink data EDD to the user equipment 11 on the control plane, the early downlink data EDD carried by the RRC response message Msg4b may be packaged into a Downlink NAS PDU and be protected by NAS security. After the user equipment 11 attached to network successfully, the NAS security of the user equipment 11 will keep in synchronization with the NAS security of the MME of the core network 15, and therefore any uplink data or downlink data may be successfully encrypted or decrypted based on the NAS security.

In the case where the base station 13 transmits the early downlink data EDD to the user equipment 11 on the user plane, the early downlink data EDD may be directly carried in the RRC response message Msg4b by the base station 13 and be protected by AS security. The base station 13 may provide an updated key to the user equipment 11 in each random access procedure so that the user equipment 11 can encrypt and decrypt data during the next random access procedure. For example, the base station 13 may provide a Next-hop Chaining Count (NCC) via an RRC connection release message in each random access procedure, for the use of the user equipment 11 in the next random access procedure.

After the base station 13 transmits the RRC response message Msg4b carrying the early downlink data EDD to the user equipment 11, the user equipment 11 may enter the RRC connected state or remain in the RRC idle state based on the received RRC response message Msg4b.

In some embodiments, in the case where the base station 13 does not know whether there is uplink data UD carried in the RRC request message Msg3b, or does not know the size of the uplink data UD, the processor 131 of the base station 13 may blindly decode the RRC request message Msg3b according to a plurality of available transport block sizes. That is, the RRC request message Msg3b is decoded based on the plurality of available transport block sizes one by one in a preset order or a random way.

After the user equipment 11 transmits the RRC request message Msg3b to the base station 13 (i.e., the action 317), the base station 13 and the core network 15 may perform the signaling transmissions (labeled as an action 318) in advance which should be performed for the base station 13 to receive the early downlink data EDD from the core network 15 after the user equipment 11 enters the RRC connected state. For example, in the case where the user equipment 11 and the base station 13 perform the contention-based random access procedure 3 on the control plane, the action 318 may comprise: the base station 13 retrieving a user equipment context from the MME of the core network 15; the base station 13 transmitting an S1-AP initial UE message carrying an early-data transmission indicator to the MME to inform the MME that the base station 13 is going to initiate an MT-EDT; the MME transmitting a Modify Bearer Request Message to the S-GW of the core network 15 and receiving a Modify Bearer Response Message transmitted by the S-GW to establish a channel for transmitting data between the S-GW and the MME; and after establishing the channel for transmitting data between the S-GW and the MME, the MME receiving the early downlink data EDD transmitted by the S-GW and then transmitting a Downlink S1-AP Message to the base station 13 to transmit the early downlink data EDD to the base station 13.

On the other hand, in the case where the user equipment 11 and the base station 13 perform the contention-based random access procedure 3 on the user plane, the action 318 may comprise: the base station 13 transmitting an S1-AP UE Context Resume Request Message to the MME of the core network 15 and receiving an S1-AP UE Context Resume Response Message returned by the MME; the base station 13 concatenating an early-data transmission indicator to the S1-AP UE Context Resume Request Message to inform the MME that the base station 13 is going to initiate an MT-EDT; the MME transmitting a Modify Bearer Request Message to the S-GW of the core network 15 and receiving a Modify Bearer Response Message transmitted by the S-GW to establish a channel for transmitting data between the S-GW and the base station 13; and after establishing the channel for transmitting data between the S-GW and the base station 13, the base station 13 receiving the early downlink data EDD transmitted by the S-GW.

Referring to FIG. 3, in the contention-based random access procedure 3, optionally, after the action 319 is performed by the base station 13 and the user equipment 11, the user equipment 11 may generate uplink data UD corresponding to the early downlink data in response to the early downlink data transmitted by the base station 13 in the action 319, and may perform the same operation 23 as described above to transmit the uplink data UD corresponding to the early downlink data to the base station 13.

It should be noted that the launch of the operation 23 is not limited to the moment when the action 215 (in FIG. 2) or the action 319 (in FIG. 3) is finished. Basically, as long as the user equipment 11 receives the early downlink data EDD from the base station 13 in any random access procedure, the user equipment 11 can decide whether to perform the operation 23.

Figure 4:
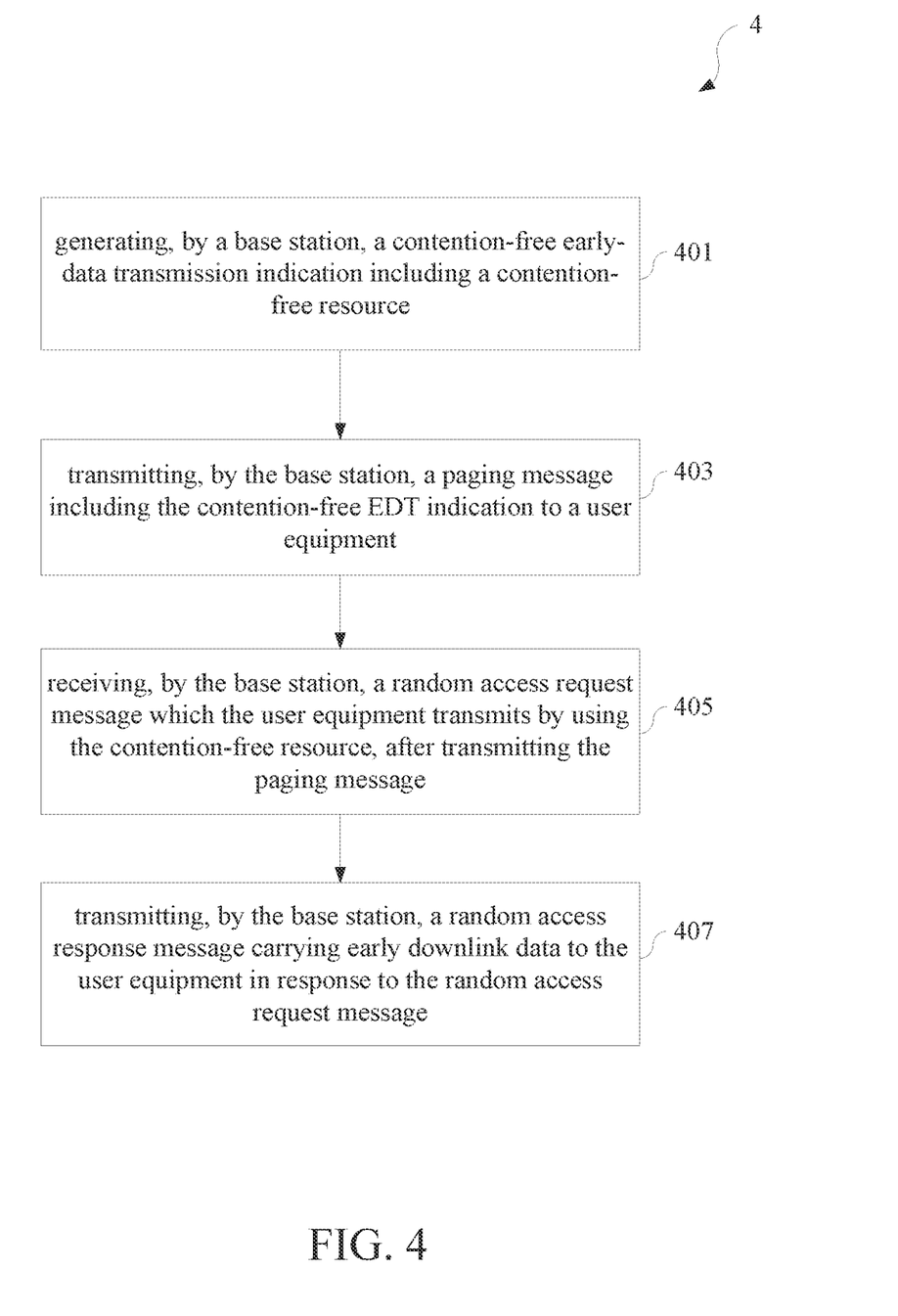
FIG. 4 illustrates a schematic view of a method for early-data transmission during a contention-free random access procedure performed in the wireless communication system of FIG. 1 according to some embodiments.

FIG. 4 illustrates a schematic view of a method 4 for early-data transmission of the wireless communication system 1 of FIG. 1 during a contention-free random access procedure according to some embodiments. Contents shown in FIG. 4 are only for illustrating embodiments of the present invention rather than for limiting the present invention.

Referring to FIG. 4, the method 4 for early-data transmission during a contention-free random access procedure may comprises the steps of: generating, by a base station, a contention-free early-data transmission indication including a contention-free resource (labeled as a step 401); transmitting, by the base station, a paging message including the contention-free early-data transmission indication to a user equipment (labeled as a step 403); receiving, by the base station, a random access request message which the user equipment transmits on the contention-free resource, after transmitting the paging message (labeled as a step 405); and transmitting, by the base station, a random access response message carrying early downlink data to the user equipment in response to the random access request message (labeled as a step 407).

The order in which the steps 401 to 407 of FIG. 4 are executed is not limited and may be adjusted while the method 4 still can be implemented.

Figure 5:
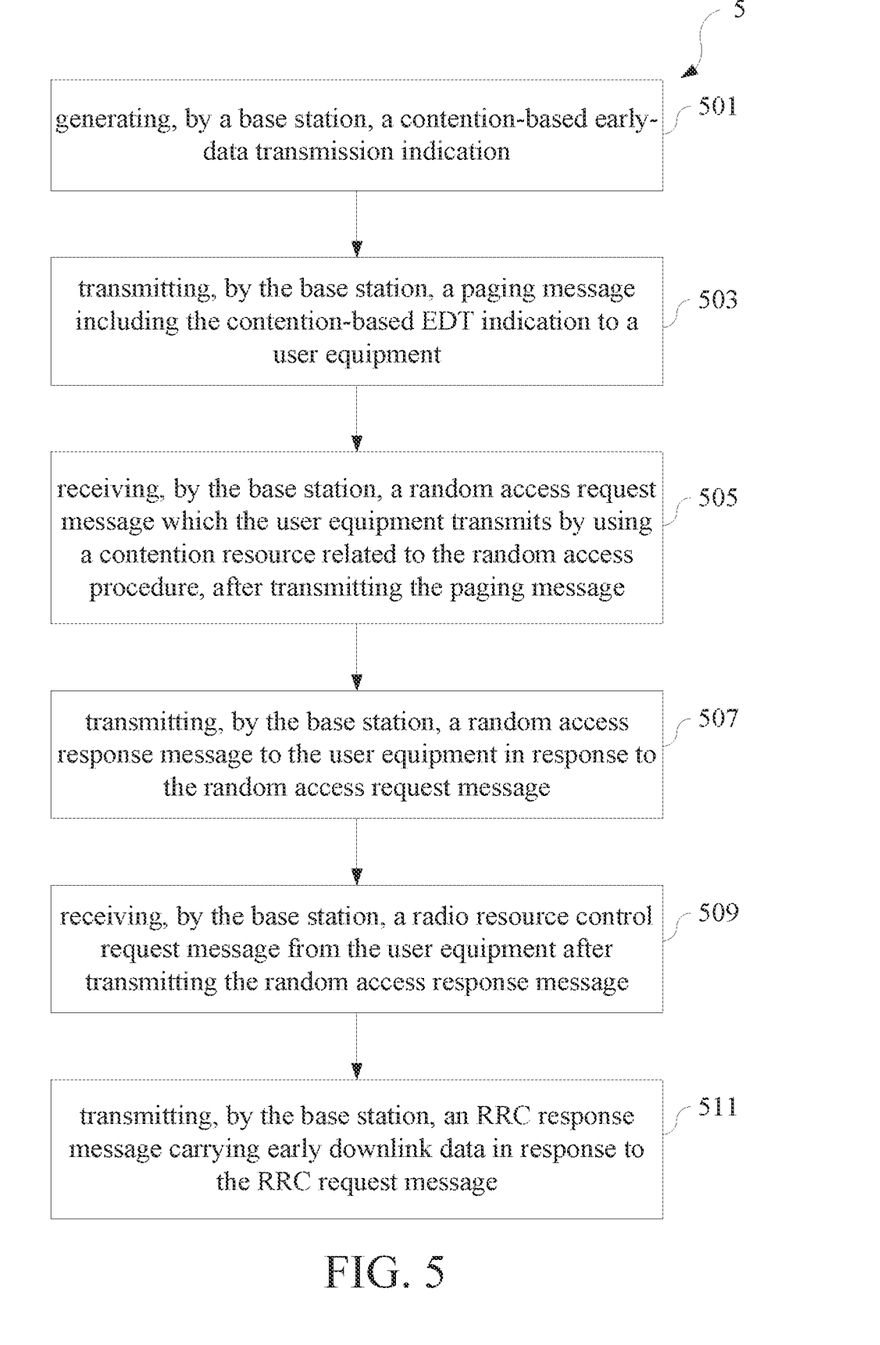
FIG. 5 illustrates a schematic view of a method for early-data transmission during a contention-based random access procedure performed in the wireless communication system of FIG. 1 according to some embodiments.

FIG. 5 illustrates a schematic view of a method 5 for early-data transmission during a contention-based random access procedure performed in the wireless communication system 1 of FIG. 1 according to some embodiments. Contents shown in FIG. 5 are only for illustrating embodiments of the present invention rather than for limiting the present invention.

Referring to FIG. 5, the method 5 for early-data transmission during a contention-based random access procedure may comprises the steps of: generating, by a base station, a contention-based early-data transmission indication (labeled as a step 501); transmitting, by the base station, a paging message including the contention-based early-data transmission indication to a user equipment (labeled as a step 503); receiving, by the base station, a random access request message which the user equipment transmits on a contention-based resource related to the random access procedure, after transmitting the paging message (labeled as a step 505); transmitting, by the base station, a random access response message to the user equipment in response to the random access request message (labeled as a step 507); receiving, by the base station, a radio resource control (RRC) request message from the user equipment after transmitting the random access response message (labeled as a step 509); and transmitting, by the base station, an RRC response message carrying early downlink data in response to the RRC request message (labeled as a step 511).

The order in which the steps 501 to 511 of FIG. 5 are executed is not limited and may be adjusted while the method 5 still can be implemented.

Figure 6:
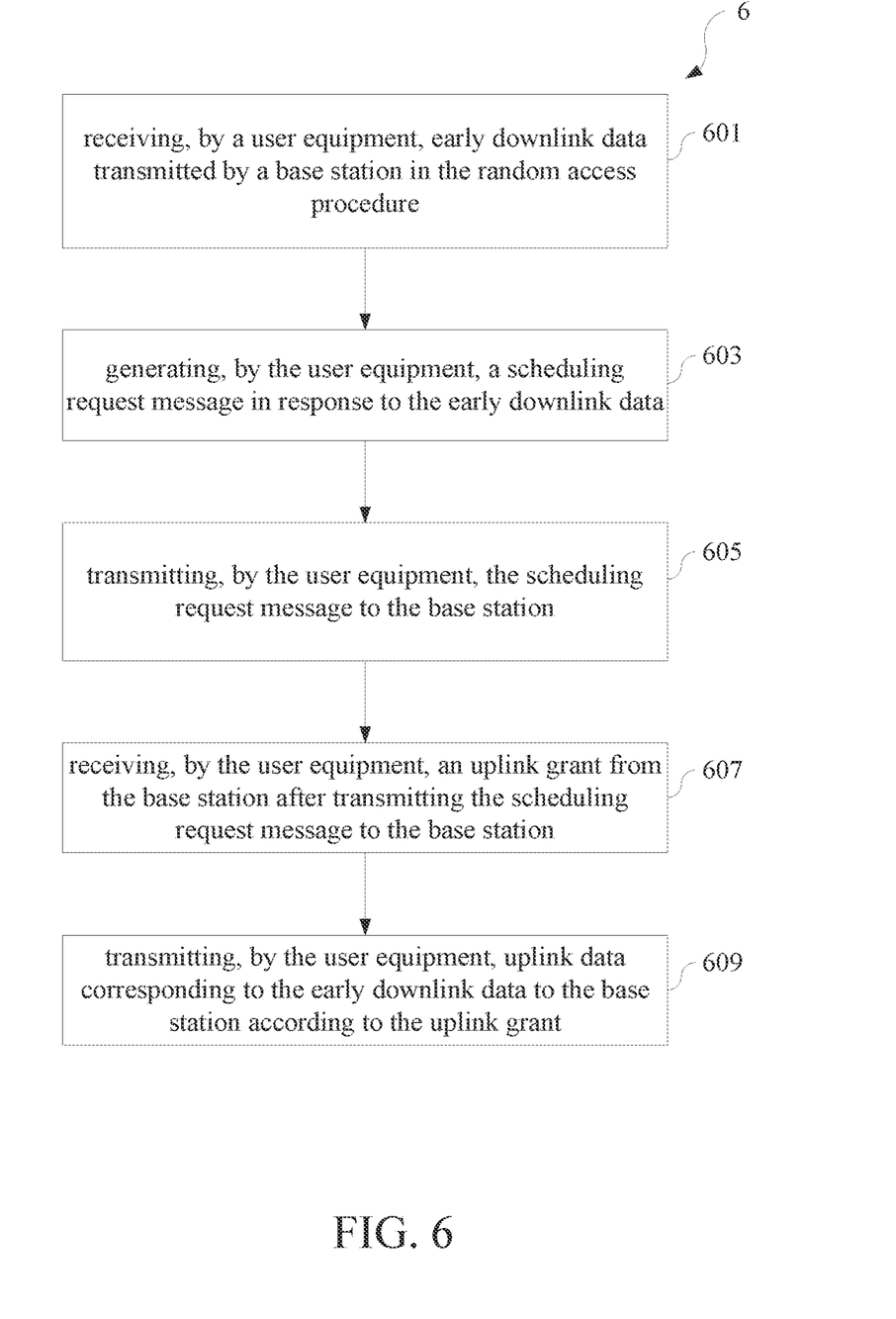
FIG. 6 illustrates a schematic view of a method for transmitting uplink data corresponding to the early downlink data during a random access procedure performed in the wireless communication system of FIG. 1 according to some embodiments.

FIG. 6 illustrates a schematic view of a method 6 for transmitting uplink data corresponding to early downlink data during a random access procedure performed in the wireless communication system 1 of FIG. 1 according to some embodiments. Contents shown in FIG. 6 are only for illustrating embodiments of the present invention rather than for limiting the present invention.

Referring to FIG. 6, the method 6 for transmitting uplink data corresponding to early downlink data in a random access procedure may comprises the steps of: receiving, by a user equipment, early downlink data transmitted by a base station in the random access procedure (labeled as a step 601); generating, by the user equipment, a scheduling request message in response to the early downlink data (labeled as a step 603); transmitting, by the user equipment, the scheduling request message to the base station (labeled as a step 605); receiving, by the user equipment, an uplink grant from the base station after transmitting the scheduling request message to the base station (labeled as a step 607); and transmitting, by the user equipment, uplink data corresponding to the early downlink data to the base station according to the uplink grant (labeled as a step 609).

The order in which the steps 601 to 609 of FIG. 6 are executed is not limited and may be adjusted while the method 6 still can be implemented.

In some embodiments, the aforesaid all steps of the method 4 for early-data transmission, the method 5 for early-data transmission, and the method 6 for transmitting uplink data corresponding to early-data may all be executed in the wireless communication system 1. In addition to the aforesaid steps, the methods 4, the method 5, and the method 6 each may also comprise other steps corresponding to the aforesaid all embodiments associated with the wireless communication system 1. These other steps shall be appreciated by a person having ordinary skill in the art depending on the above description for the wireless communication system 1, and thus will not be further described herein.

The above disclosure is related to the detailed technical contents and inventive features thereof. A person having ordinary skill in the art may proceed with a variety of modifications and replacements according to the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A user equipment for performing a random access procedure with a base station, comprising:
a processor, being configured to generate a scheduling request message in response to early downlink data transmitted by the base station in the random access procedure; and
a transceiver, being electrically connected with the processor and configured to:
receive a paging message including a contention-based early-data transmission indication from the base station;
transmit a random access request message to the base station on a contention-based resource related to the random access procedure;

receive a random access response message from the base station after transmitting the random access request message;

transmit a radio resource control (RRC) request message to the base station after receiving the random access response message;

receive an RRC response message carrying the early downlink data from the base station after transmitting the RRC request message;

transmit the scheduling request message to the base station after receiving the early downlink data;

receive an uplink grant from the base station after transmitting the scheduling request message to the base station; and transmit uplink data corresponding to the early downlink data to the base station according to the uplink grant.

2. The user equipment of claim 1, wherein the RRC request message is an RRC connection request message or an RRC early-data request message.

3. The user equipment of claim 1, wherein the RRC request message is an RRC connection resume request message, and the RRC response message is an RRC connection resume message or an RRC connection release message.

4. The user equipment of claim 1, wherein the processor is further configured to determine a number of retransmission of the RRC request message according to a transport block size limitation configured by the random access response message.

5. The user equipment of claim 1, wherein the scheduling request message transmitted to the base station carries a hybrid automatic repeat request (HARQ) acknowledgement for the early downlink data.

6. A method for a user equipment to perform a random access procedure with a base station, comprising the following steps of:

receiving a paging message including a contention-based early-data transmission indication from the base station;

transmitting a random access request message to the base station on a contention-based resource related to the random access procedure;

receiving a random access response message from the base station after transmitting the random access request message;

transmitting a radio resource control (RRC) request message to the base station after receiving the random access response message;

receiving an RRC response message carrying early downlink data from the base station after transmitting the RRC request message;

generating a scheduling request message in response to the early downlink data transmitted by the base station in the random access procedure;

transmitting the scheduling request message to the base station after receiving the early downlink data;

receiving an uplink grant from the base station after transmitting the scheduling request message to the base station; and transmitting uplink data corresponding to the early downlink data to the base station according to the uplink grant.

7. The method of claim 6, wherein the RRC request message is an RRC connection request message or an RRC early-data request message.

8. The method of claim 6, wherein the RRC request message is an RRC connection resume request message, and the RRC response message is an RRC connection resume message or an RRC connection release message.

9. The method of claim 6, further comprising determining a number of retransmission of the RRC request message according to a transport block size limitation configured by the random access response message.

10. The method of claim 6, wherein the scheduling request message transmitted to the base station carries a hybrid automatic repeat request (HARQ) acknowledgement for the early downlink data.

* * * * *